Patented Aug. 12, 1947

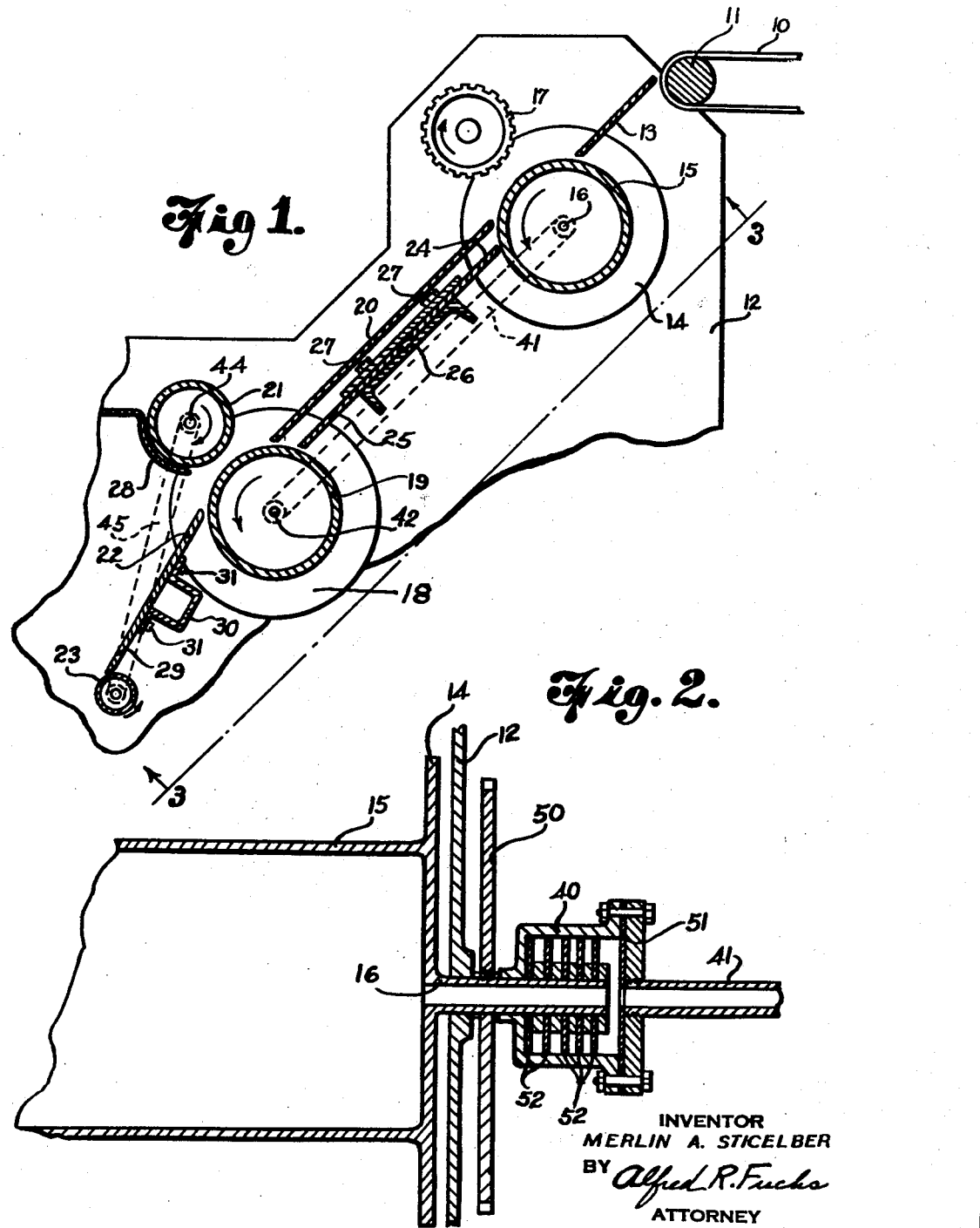

2,425,356

UNITED STATES PATENT OFFICE 2,425,356

BREAD MOLDING MACHINE

Merlin A. Sticelber, Kansas City, Mo., assignor to Quik-Seal, Inc., a corporation of Missouri Application February 2, 1944, Serial No. 520,750

8 Claims. (Cl. 107—12)

1

My invention relates to dough shaping or molding machines, and more particularly to refrigerating means for such dough shaping or molding machines.

In machines of the general character shown in the patent to Overkamp and Streich, 901,031, patented October 13, 1908, for Loaf forming machine, and the patent to Hueg, 875,930, patented January 7, 1908, for Dough shaping machine, used for molding loaves for bread and for similar purposes, there are rollers provided for rolling out the dough in a sheet-like form and for curling the sheet-like dough on itself to form a roll of the dough, which produces the loaf. It is necessary that the dough engaging surfaces of certain of the rollers be kept clean, in order to obtain the proper functioning of the machine. This is necessary in order that the surfaces remain smooth and that the pieces of dough will not stick to the rollers, as, otherwise the rollers will not properly perform their sheeting or other operations. In order to accomplish this, scrapers are ordinarily provided for cleaning any dough that may accumulate on the rollers off the same.

In order that these scapers will function properly, it is necessary that the same be placed very closely adjacent the rollers, so as to contact slightly therewith, to perform the scraping operation. The friction of the scrapers on the rollers, due to this arrangement, however, creates a great amount of heat, and as a result the scrapers and rollers become so hot after the machine has been in operation for a while that it is substantially impossible to touch these. The dough which is to be operated on in the machine is in a warm condition when it reaches the molding machine and is further heated by the heat of the rollers created by the contact of the scraping device therewith so that it becomes sticky and tends to adhere to the rollers. The longer the machine is in operation the more aggravated this condition becomes, because of the fact that as the rollers heat up the same expand and the scrapers have a greater frictional bearing on the rollers, thus creating more frictional heat as the machine continues in operation, the heat conditions and the tendency of the dough to stick thus becoming worse and worse as the machine is operated.

It has been customary to feed in rounded pieces of dough, that have been proofed to a certain extent, at regular spaced intervals into the entrance end of the machine in the operation of machines of the above mentioned character. If any sticking on any of the rollers by any of the pieces of dough occurs in their progress through the machine, this will cause the same to travel therethrough irregularly, causing either mutilated loaves of bread that are not of proper shape due to such sticking action, or the adherence of two or more of the rounded pieces of dough to each other in going through the machine will result, due to the delay in the progress of one thereof through the machine, because of the sticking action, producing loaves of improper size, which must be removed from the machine and returned to the divider, which sizes the pieces of dough.

In order to attempt to overcome these difficulties, it has been customary to apply large quantities of dusting flour to the rollers of such a machine to reduce the sticking action. However, the use of such large quantities of dusting flour causes undesirable streaks in the dough and in the finished loaf of bread, and even when large quantities of dusting flour are used the sticking occurs occasionally and interferes with the operation of the machine, frequently making it necessary to stop the machine and clean off the rollers.

It is the principal purpose of my invention to provide means for cooling the rollers and also the scrapers, through heat transfer to the rollers, to thus prevent undue heating of both the rollers and the scrapers and the sticking of the dough thereto. The prevention of sticking is accomplished, preferably, without the use of any dusting flour, the means for preventing sticking constituting a film of moisture on the rollers and the temperature of the rollers, which prevents the heating of the dough to the point where it would become sticky. By cooling the rollers to the proper temperature, which is a temperature between the dew point of the air surrounding the rollers and the freezing point of water, water is condensed from the air onto the rollers but remains in a liquid state so as to form a slimy or slick film on the rollers, which prevents any sticking of the dough thereto. Furthermore this temperature prevents any expansion of the rollers into too tight engagement with the scrapers, thus preventing any increase in frictional heat generated by the scrapers engaging the rollers, as is the case if no such cooling means is utilized. While a very small quantity of dusting flour will no do harm, if a baker insists on utilizing some, this is actually not necessary, as such a machine can be operated with my cooling means applied thereto without the use of any dusting flour whatsoever.

This is due to the fact that in machines of the above mentioned character the sticking action is not prevented by the use of large quantities of flour, but only reduced, and that less sticking will take place if the temperature is kept at the proper point so that the rollers will be cool and moist and the dough will not be at a stage that it will have such stickiness as to tend to adhere to the rollers.

The moistening of the rollers, preferably, takes place by cooling of the rollers to the extent that moisture in the air will be condensed thereon to thus moisten the surface of the rollers with which the dough engages, but the flow of refrigerant is controlled so that the temperature of the surface of the rollers is above the freezing point of water so that ice or frost will not form thereon.

Other objects and advantages of my invention will appear as the description of the drawings proceeds. I desire to have it understood, however, that I do not intend to limit myself to the particular details shown or described, except as defined in the claims.

In the drawings:

Fig. 1 is a vertical sectional view through a portion of a dough molding machine, a portion of the frame being shown in elevation, showing my invention applied thereto.

Fig. 2 is an enlarged fragmentary sectional view through one end of a roller and adjacent portions of the device.

Figure 3:
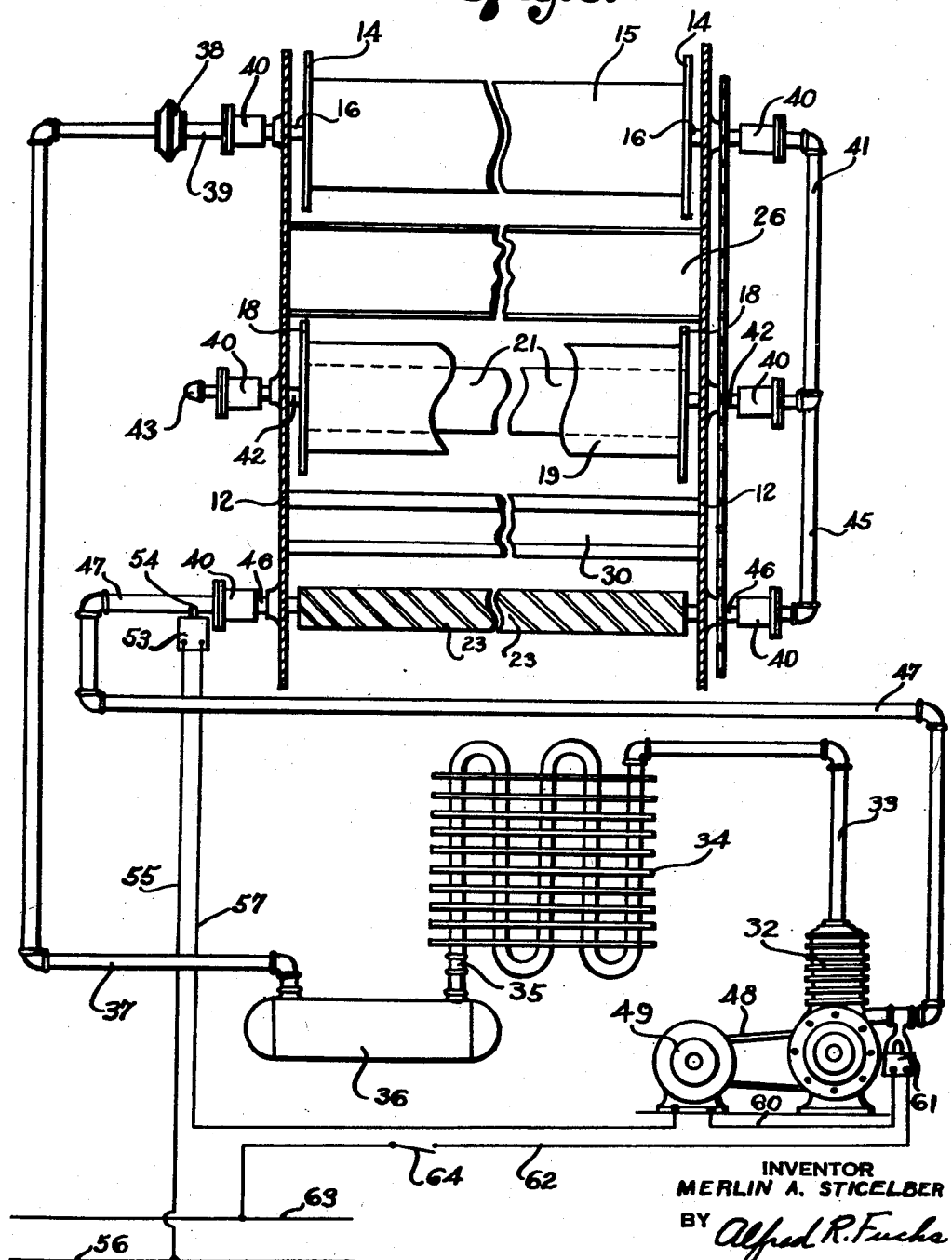
Fig. 3 is a view taken partly in section along the line 3—3 of Fig. 1, partly broken away, and diagrammatically showing the refrigerating system and the electrical circuit controlling the operation thereof.

Referring in detail to the drawings, my invention is shown as being applied to a bread molding machine, in which the rounded pieces of dough acted on thereby are fed into the machine by means of the belt conveyor 10, which operates over the roller 11, said conveyor being driven in any suitable manner. The rounded pieces of dough are deposited one at a time on the conveyor belt 10 in suitably spaced relation, by any suitable means. The machine is provided with any suitable frame, comprising the side members 12 having suitable bearings for the rollers forming part of the machine, which are driven by any suitable driving means, only a portion thereof being shown in the drawings. Said frame is also provided with suitable means for supporting the various guiding means and other parts that cooperate with the rollers to direct the dough through the machine, as is customary in machines of this character. An inclined guide member 13 is provided, which extends from the discharge end of the belt conveyor 10 between the flanges 14 of a flanged roller 15. Said roller 15 is provided with hollow shaft portions 16 projecting from the ends thereof and mounted rotatably in suitable bearings in the frame 12, said roller 15 being a hollow cylinder, as will be obvious from Fig. 1. Cooperating with the roller 15 is a grooved roller 17, which serves to draw the rounded pieces of dough into the machine between the rollers to partly flatten the same in the first step of the molding operation.

Suitably mounted on the frame and extending from between the flanges 14 of the flanged roller 15 to between the flanges 18 of the flanged roller 19 is an inclined guide member 20. The guide member 13 deposits the rounded pieces of dough on top of the roller 15, which carries these rounded pieces into engagement with the roller 17, whereupon these two rollers cooperate to flatten the rounded pieces of dough and carry them onto the guide member 20, said rollers 15 and 17 rotating in the direction indicated by the arrows in Fig. 1.

A smooth surfaced roller 21 cooperates with the roller 19 to complete the sheeting of the dough, these rollers rotating in the direction indicated by the arrows thereon. The dough that has been rolled into a flat sheet passes downwardly along the surface of a suitably supported guide member 22 onto a roller 23, which is grooved and forms part of the curling mechanism. The rollers 15, 19, 21 and 23 are all hollow cylindrical members and are all smooth surfaced except the roller 23, which is provided with suitable grooves in its surface, as is common in curling mechanisms in bread molding machines. The roller 23 rotates in the direction indicated by the arrow in Fig. 1.

The molding machine, of which a portion is shown in the drawings, is a common form of bread molding or loaf forming machine now in use, and while the arrangement of the rollers and character of grooves therein may vary with different makes of machines, the important thing is that certain of the rollers, such as the rollers 15, 19, 21 and 23, are provided with scrapers, as explained below. These scrapers cause heating of the rollers with which the same cooperate, and if the rollers are not cooled, this heating action, due to the friction of the scrapers on the rollers, will cause the rollers to expand, thus increasing the pressure of the scrapers on the rollers and increasing the friction, and further increasing the heating effect. My invention cools the rollers and, by conduction, the scrapers, to avoid such increase in the temperature of the rollers as would cause expansion thereof and greater contact pressure between the scrapers and rollers, and avoids the above referred to sticking action of the dough caused by the heating of the rollers. While certain arrangements and types of scrapers are shown in the drawings, the particular shape or mounting of a scraper can be varied without departing from my invention.

The roller 15 is shown as having a scraper blade 24 cooperating therewith, and the roller 19 a scraper blade 25, said scraper blades being mounted on a frame member 26 by any suitable means, such as the securing elements 27. The scraper blade 28 cooperates with the roller 21, being, preferably, of a curved character, so as to not interfere with any other parts of the machine, and to engage said roller at the desired point closely adjacent the portion thereof where the dough is rolled between the same and the roller 19. A scraper 29 cooperates with the roller 23, being mounted on the frame member 30 by means of any suitable securing means, such as the headed members 31, the mounting of the blade 28 on the frame not being shown.

The scraper blade 29 is ordinarily only a continuation of the guide member 22, as shown in Fig. 1 of the drawings, although the particular structure of the scrapers is of no particular importance to this invention. All of the scraper blades frictionally engage the surface of the rollers with which the same cooperate, and all the parts of the scrapers and rollers being of metal, the heat generated by the friction is transferred from scraper to roller, and vice versa.

My improved cooling means for the rollers and scrapers comprises the usual compressor 32, from which the conduit 33 extends to a condenser 34, and said condenser 34 is connected by means of a conduit 35 with a receiver 36, from which the compressed liquefied refrigerant passes through a conduit 37 to an expansion valve 38. From the expansion valve 38 a conduit 39 extends into a coupling 40, which is connected with the hollow shaft portion 16 at one end of the tubular roller 15. A similar coupling 40 connects the hollow shaft member 16 at the other end of the roller 15 with the conduit 41, which is connected through a similar coupling member 40 with the hollow tubular shaft 42 extending from one end of the roller 19. A hollow tubular shaft 42 also extends from the other end of the roller 19 and a coupling 40 connects said hollow tubular shaft 42 with the conduit 43, which is similarly connected with a hollow tubular shaft extending from the left hand end of the roller 21, (as viewed in Fig. 3). Also a similar coupling connects the hollow tubular shaft 44 on the end of the roller 21 opposite that with which the conduit 43 is connected with the conduit 45, which is connected with a hollow tubular shaft 46 extending from the one end of the roller 23, the hollow tubular shaft 46 extending from the other end of the roller 23 being connected by means of a coupling 40 with the suction line 47 extending to the compressor 32. The compressor 32 is operated in any suitable manner, as through the belt drive 48, from a motor 49.

Referring to Fig. 2 it will be noted that the interior of the hollow tubular or cylindrical roller 15 is connected with the hollow or tubular shaft 16 liquid tight, being shown as being integral therewith, although any suitable fluid tight connection may be provided between the shaft 16 and the roller 15, such that said rollers 15 and 16 will rotate as a unit, said roller being driven through a driving means, such as the sprocket 50 keyed to the shaft 16. The couplings 40 provide a fluid tight connection between the various hollow shaft portions projecting from the various rollers and the conduits connected therewith, as will be evident from Fig. 2, the conduit 41 being shown as being connected fluid tight with the shaft 16 by means of said coupling 40, the fluid tight connection being obtained by means of the gasket member 51 and the sealing rings 52 rotatably mounted on said shaft 16 within the coupling member 40, the particular construction of the sealing member being variable, such sealing members being of a standard character to provide a tight joint between a rotatable and a stationary member.

It will accordingly be obvious that the expansion coil of my refrigerating means for dough molding machines comprises the rollers 15, 19, 21 and 23 connected in series, the flow of refrigerant being lengthwise through the roller 15 from the expansion valve through the conduit 41, at the right hand end of the roller 19 as viewed in Fig. 3, lengthwise through said roller and through the conduit 43 to the left hand end of the roller 21, lengthwise through said roller 21 and through the conduit 45 to the roller 23 and lengthwise through said roller 23 to the suction pipe 47.

Suitable means is provided for controlling the operation of the refrigerating means so as to obtain the desired temperature on the surface of the rollers, so that moisture will condense thereon to keep the surface thereof wet, but so that a temperature so low as to cause frost or ice to form on said rollers will not be reached. Such control is, preferably, obtained by means of an adjustable temperature responsive switch 53 having a bulb 54 engaging the suction line closely adjacent the discharge end of the run or length of the expansion coil formed by the roller 23, a conductor 55 extending to said switch from a line wire 56, and a conductor 57 extending from said switch to one terminal of the motor 49. A conductor 60 extends from the other terminal of the motor 49 to a pressure responsive switch 61, which is so mounted between the suction line and the compressor as to be responsive to pressure in the suction line, and a conductor 62 leads from the switch 61 to the line wire 63 through any suitable manually operated switch 64.

The motor 49 will operate responsive to pressure changes in the suction line 47 as long as the circuit is closed through the wires 55 and 57, due to the fact that the temperature responsive switch 53 is kept closed. However, should the temperature at the point where the suction line 47 connects with the expansion coil become too low, the switch 53 will open in a well known manner and the operation of the motor 49 will be halted, preventing any possibility of the temperature of the surface of the various rollers becoming too low. As the pressure operated switch 61 can be adjusted so as to obtain substantially the desired temperature of the surface of the various rollers 15, 19, 21 and 23, the thermostatically operated switch 53 merely serves as additional means to prevent any possibility of frost being formed on said rollers. While there will, of course, be a slight pressure differential between the surfaces of the various rollers that are connected in series to form the expansion coil, this will not be very great, and as ordinarily rather wide limits in temperature are permissible for the successful operation of the device, due to the fact that the dew point is ordinarily rather far removed from the freezing point of water in the humid atmosphere existing in bakeries, the temperature of all the rollers can be readily maintained at such a point that no frost will form thereon, but moisture will always be condensed thereon from the atmosphere surrounding the same to keep the same thoroughly moistened.

It will be obvious that as the rounded pieces of dough pass into the machine, these will first engage the cooled surface of the roller 15, and after being somewhat flattened, will engage the cooled surface of the rollers 21 and 19 and will finally engage the cooled roller 23 of the curling mechanism. This will have a cooling effect on the dough, but this cooling effect will not be sufficient to do any harm to the dough, but will be sufficient that no undue heating of the dough will take place that will cause it to assume a sticky condition, causing the various difficulties previously described. While the four rollers 15, 19, 21 and 23 are shown as being cooled, it is not always necessary that all these rollers be cooled, and in some machines operating on dough to sheet the same, the number of sheeting rollers in the machine is less than that shown. It will be obvious that my invention can be applied to any series of such rollers, no matter how many are used, and that either all thereof or any ones thereof that may be found desirable may be cooled as herein described.

What I claim is:

1. In a machine of the character described, cooperating, paired, hollow rollers rotating on parallel axes and having their outer surfaces in contact with atmospheric air, straight edged scrapers engaging said rollers, said rollers having means for passing a cooling medium longitudinally therethrough comprising a cooling medium inlet at one end of each thereof and a cooling medium outlet at the other end of each thereof and means for controlling the flow of said cooling medium to maintain the surface of said rollers at a temperature above the freezing point of water but low enough to condense water from the air surrounding said rollers onto the same.

2. In a machine of the character described, a plurality of cooperating hollow rollers rotating on parallel axes and having their outer surfaces in contact with atmospheric air, straight edged scrapers engaging said rollers, said rollers having means for successively passing a cooling medium longitudinally through said rollers, comprising a cooling medium inlet at one end of each of said rollers, and a cooling medium outlet at the end of each of said rollers opposite said inlet, and conduit means connecting the outlet of one roller with the inlet to the succeeding roller, and means for controlling the flow of said cooling medium to maintain the surface of said rollers at a temperature above the freezing point of water but low enough to condense water from the air surrounding said rollers onto the same.

3. In a machine of the character described, a plurality of cooperating hollow rollers rotating on parallel axes and having the outer surfaces thereof in contact with atmospheric air, said rollers each having an inlet connection at one end thereof and an outlet connection at the other end thereof, scrapers engaging said rollers, means connecting the inlet and outlet connections of said rollers in series to form a cooling coil of which said rollers constitute succeeding lengths, means for passing a cooling medium through said cooling coil, and means for controlling the flow of said cooling medium to maintain the surface of said rollers at a temperature above the freezing point of water but low enough to condense water from the air surrounding said rollers onto the same.

4. In a machine of the character described, a plurality of hollow cooperating rollers having their outer surfaces in contact with atmospheric air, said rollers rotating about parallel axes and each having an inlet connection at one end thereof and an outlet connection at the other end thereof, straight edged scrapers engaging said rollers, and means for cooling said rollers and scrapers comprising means connecting the inlet and outlet connections of said rollers in series to form an expansion coil of said rollers collectively, means for supplying refrigerant to the first of said series of rollers, means for discharging expanded refrigerant from the last of said series of rollers, and means for controlling the flow of said refrigerant through said coil to maintain the surface of said rollers at a temperature above the freezing point of water but low enough to condense water from the air surrounding said rollers onto the same.

5. In a machine of the character described, a plurality of hollow rollers cooperating to sheet dough, said hollow rollers having their outer surfaces in contact with atmospheric air and rotating on parallel axes, scrapers engaging said rollers, and means for cooling said rollers internally to maintain the surface of said rollers at a temperature above the freezing point of water but low enough to condense water from the air surrounding said rollers onto the same.

6. In a machine of the character described, a plurality of cooperating hollow rollers rotating on parallel axes and having their outer surfaces in contact with atmospheric air, straight edged scrapers engaging said rollers and means for cooling said rollers and scrapers, comprising means for passing a cooling medium successively longitudinally through said rollers, comprising a cooling medium inlet at one end of each of said rollers and a cooling medium outlet at the end of each of said rollers opposite said inlet, and conduit means connecting the outlet of one roller with the inlet of the succeeding roller.

7. In a machine of the character described, a plurality of cooperating hollow rollers rotating on parallel axes and each having an inlet connection at one end thereof and an outlet connection at the other end thereof, scrapers engaging said rollers, and means for cooling said rollers and scrapers comprising conduits connecting the outlet and inlet connections of said rollers in series to form an expansion coil of said rollers collectively, means for supplying refrigerant to the first of said series of rollers through its inlet connection and means for discharging expanded refrigerant from the last of said series of rollers through its outlet connection.

8. In a machine of the character described, a plurality of cooperating hollow rollers rotating on parallel axes, having their outer surfaces exposed to the atmosphere, and each having an inlet connection at one end thereof and an outlet connection at the other end thereof, scrapers engaging said rollers, means connecting the inlet and outlet connections of said rollers in series to form a cooling coil of which said rollers constitute succeeding lengths, said connecting means being of much smaller diameter than said rollers, and means for passing a cooling medium through said cooling coil.

MERLIN A. STICELBER.

REFERENCES CITED

The following references are of record in the file of this patent:

UNITED STATES PATENTS

| Number | Name | Date |
| --- | --- | --- |
| 2,344,922 | Raver | Mar. 21, 1944 |
| 2,123,596 | Doering | July 12, 1938 |
| 2,001,084 | Walter | May 14, 1935 |
| 2,102,866 | Walter | Dec. 21, 1937 |
| 2,344,836 | Sticelber | Mar. 21, 1944 |
| 2,004,009 | Moir | June 4, 1935 |
| 1,583,333 | Bigum | May 4, 1926 |
| 642,620 | Mather | Feb. 6, 1900 |

FOREIGN PATENTS

| Number | Country | Date |
| --- | --- | --- |
| 319,256 | Great Britain | Sept. 16, 1929 |